United States Patent
Kim et al.

(10) Patent No.: US 11,575,635 B2
(45) Date of Patent: Feb. 7, 2023

(54) METHOD FOR NOTIFYING RECEPTION OF MESSAGE INCLUDING USER-SET KEYWORD, AND NON-TRANSITORY COMPUTER-READABLE RECORDING MEDIUM FOR EXECUTING THE SAME

(71) Applicant: LINE Corporation, Tokyo (JP)

(72) Inventors: Eun Hyuk Kim, Seongnam-si (KR);
Soon Ho Kwon, Seongnam-si (KR);
Geum Yong Yoo, Seongnam-si (KR);
Dong Young Kim, Seongnam-si (KR);
Yong Gi Hwang, Seongnam-si (KR);
Chui Soon Choi, Seongnam-si (KR);
Yong Seon Yim, Seongnam-si (KR)

(73) Assignee: LINE CORPORATION, Tokyo (JP)

(*) Notice: Subject to any disclaimer, the term of this patent is extended or adjusted under 35 U.S.C. 154(b) by 0 days.

(21) Appl. No.: 17/574,877

(22) Filed: Jan. 13, 2022

(65) Prior Publication Data

US 2022/0141170 A1  May 5, 2022

Related U.S. Application Data

(63) Continuation of application No. 16/784,366, filed on Feb. 7, 2020, now Pat. No. 11,283,750, which is a (Continued)

(30) Foreign Application Priority Data

May 24, 2016  (KR) ........................ 10-2016-0063653

(51) Int. Cl.
*H04L 51/224*     (2022.01)
*G06F 3/0482*     (2013.01)
*H04L 51/04*      (2022.01)

(52) U.S. Cl.
CPC .......... *H04L 51/224* (2022.05); *G06F 3/0482* (2013.01); *H04L 51/04* (2013.01)

(58) Field of Classification Search
CPC ...... G06F 3/0482; H04L 51/04; H04L 51/224
See application file for complete search history.

(56) References Cited

U.S. PATENT DOCUMENTS 9,716,676 B2   7/2017  Yoon et al.
9,998,415 B1*  6/2018  Meschkat ............... H04L 51/42
(Continued)

FOREIGN PATENT DOCUMENTS

EP    2860620 A2    4/2015
JP    2005167345 A  6/2005
(Continued)

OTHER PUBLICATIONS

Korean Office Action dated Mar. 31, 2017 for corresponding KR Application No. 10-2016-0063653.
(Continued)

*Primary Examiner* — Frantz B Jean
(74) *Attorney, Agent, or Firm* — Harness, Dickey & Pierce, P.L.C.

(57) ABSTRACT

A non-transitory computer-readable recording medium having recorded thereon a computer program, which when executed by a computer, configures the computer to perform a message providing method may be provided. The method may include receiving message data including a message and metadata from a server, determining whether at least one keyword is included in the message, and updating chat room data of a reception chat room to include reception information of the message including the keyword based on results of the determining and the metadata, and displaying a chat room list based on the chat room data, the chat room list including (1) reception chat rooms having the message with (Continued)

the at least one keyword together with (2) inclusion information corresponding thereto, which indicates inclusion of the at least one keyword in the message.

9 Claims, 8 Drawing Sheets

Related U.S. Application Data continuation of application No. 15/602,467, filed on May 23, 2017, now Pat. No. 10,623,363.

(56) References Cited

U.S. PATENT DOCUMENTS

| | | | |
|---|---|---|---|
| 10,019,994 | B2 | 7/2018 | Keen |
| 2003/0037110 | A1 | 2/2003 | Yamamoto |
| 2004/0019637 | A1 | 1/2004 | Goodman et al. |
| 2007/0255702 | A1 | 11/2007 | Orme |
| 2015/0026273 | A1 | 1/2015 | Yoon et al. |
| 2015/0039475 | A1 | 2/2015 | Sterling |
| 2015/0039706 | A1 | 2/2015 | Zilmer et al. |
| 2017/0142036 | A1* | 5/2017 | Li .................... H04L 51/04 |
| 2017/0161364 | A1* | 6/2017 | Clark .................... H04L 67/306 |
| 2017/0325171 | A1* | 11/2017 | Xu .................... G06F 21/6209 |

FOREIGN PATENT DOCUMENTS

| | | |
|---|---|---|
| JP | 2016-35750 A | 3/2016 |
| KR | 10-2015-0042515 A | 4/2015 |
| KR | 10-1590418 B1 | 2/2016 |
| WO | WO-2016/002000 A1 | 1/2016 |

OTHER PUBLICATIONS

"A Method of Setting a Notification of a New Posting for the Naver Cafe Application", easy IT (Jun. 30, 2015).
"Kakao Talk Preview", http://blog.naver.com/miminijungmi/220637090253 (Feb. 24, 2016).
Japanese Office Action dated Jun. 9, 2020 issued in corresponding Japanese Patent Application No. 2016-177973.
Japanese Office Action dated Dec. 7, 2021 issued in corresponding Japanese Patent Application No. 2021-014761.

* cited by examiner

METHOD FOR NOTIFYING RECEPTION OF MESSAGE INCLUDING USER-SET KEYWORD, AND NON-TRANSITORY COMPUTER-READABLE RECORDING MEDIUM FOR EXECUTING THE SAME

CROSS-REFERENCE TO RELATED APPLICATION

This application is a continuation of U.S. application Ser. No. 16/784,366, filed on Feb. 7, 2020, which is a continuation of U.S. application Ser. No. 15/602,467, filed on May 23, 2017, now granted as U.S. Pat. No. 10,623,363 on Apr. 14, 2020, which claims priority under 35 U.S.C. § 119 to Korean Patent Application No. 10-2016-0063653 filed on May 24, 2016, in the Korean Intellectual Property Office, the entire contents of each of which are incorporated herein by reference.

BACKGROUND

1. Field

One or more example embodiments relate to non-transitory computer-readable recording medium for executing a message providing method, and/or message providing methods.

2. Description of the Related Art

This section provides background information relating to the present disclosure which is not necessarily prior art.

With rapid developments in information and communication technology, various types of terminals, such as mobile communication terminals and personal computers (PCs), have been realized to perform various functions.

For example, a mobile communication terminal has recently been realized to perform, in addition to a basic voice communication function, various functions such as a data communication function, an image or video capturing function by using a built-in camera, a music or video file reproducing function, a game playing function, and/or a broadcast watching function.

Recently, the frequency of using a messenger program, in which a plurality of users exchange messages after accessing a communication network, by using the terminals providing a capability of talking to each other, has been continuously increasing. In particular, the frequencies of opening chat rooms corresponding to various groups or gatherings are increasing, and such chat rooms may include several to hundreds of people.

When a plurality of people talk simultaneously in a chat room, a user receives message arrival notifications endlessly, and in this case, the user has to enter the chat room to check whether messages are directly related to himself/herself. The user may turn off a message arrival notification with respect to the chat room. However, when the message arrival notification is turned off, the user is not only unable to check conversations in the chat room in real-time, but is also unable to easily determine a subject of the conversation.

SUMMARY

This section provides a general summary of the inventive concepts, and is not a comprehensive disclosure of the full scope or all features of the inventive concepts.

Some example embodiments include methods and/or computer programs whereby in response to a keyword set by a user being determined to be included in a received message, the reception of the message is displayed or notified to a user to enable the user to easily determine whether the message is meaningful to the user and to quickly grasp conversation content.

Some example embodiments include methods and/or computer programs whereby a keyword included in a received message is displayed on a chat room list to enable a user to quickly grasp conversation content without having to enter a chat room.

Further, some example embodiments include methods and/or a computer programs whereby only messages including a keyword are gathered and a preview of the messages are displayed according to a user input with respect to a region where information of a chat room is displayed to enable a user to conveniently grasp the messages.

Additional aspects will be set forth in part in the description which follows and, in part, will be apparent from the description, or may be learned by practice of the presented example embodiments.

According to one or more example embodiments, a non-transitory computer-readable recording medium having recorded thereon a computer program, which when executed by a computer, configures the computer to perform (1) receiving message data from a server, the message data including a message and metadata associated with the message, (2) determining whether at least one keyword is included in the message, (3) updating chat room data of a reception chat room to include reception information of the message including the keyword based on results of the determining and the metadata, the reception chat room being a chat room including the message, the reception information being information indicating whether the message includes the at least one keyword or not, and (4) displaying a chat room list based on the chat room data, the chat room list including (i) reception chat rooms having the message with the at least one keyword and (ii) inclusion information corresponding to each of the reception chat rooms, the inclusion information indicating inclusion of the at least one keyword in the message.

According to one or more example embodiments, a message providing method includes (1) receiving message data from a server, the message data including a message and metadata associated with the message, (2) determining whether at least one keyword is included in the message, (3) updating chat room data of a reception chat room to include reception information of the message including the keyword based on results of the determining and the metadata, the reception chat room being a chat room including the message, the reception information being information indicating whether the message includes the at least one keyword or not, and (4) displaying a chat room list based on the chat room data, the chat room list including (i) reception chat rooms having the message with the at least one keyword and (ii) inclusion information corresponding to each of the reception chat rooms, the inclusion information indicating inclusion of the at least one keyword in the message.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
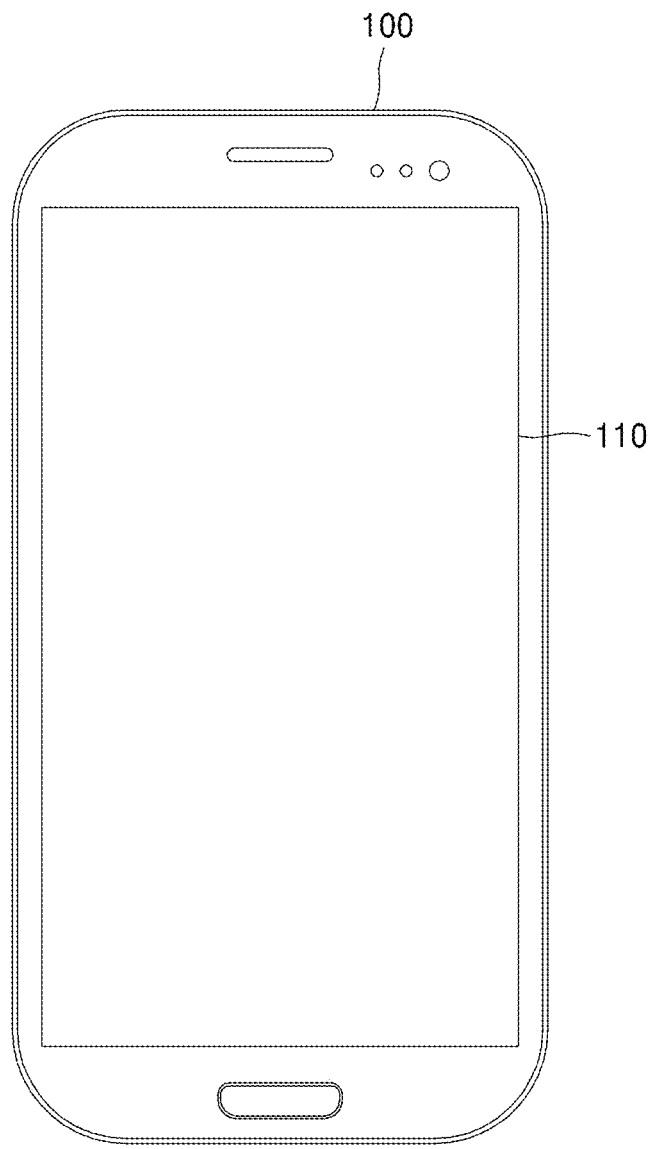
FIGS. 1 and 2 are diagrams of a structure of a user terminal performing a message providing method, according to an example embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the inventive concepts of this disclosure to those of ordinary skill in the art. Accordingly, known processes, elements, and techniques, may not be described with respect to some example embodiments. Unless otherwise noted, like reference characters refer to like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/ DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

Figure 2:
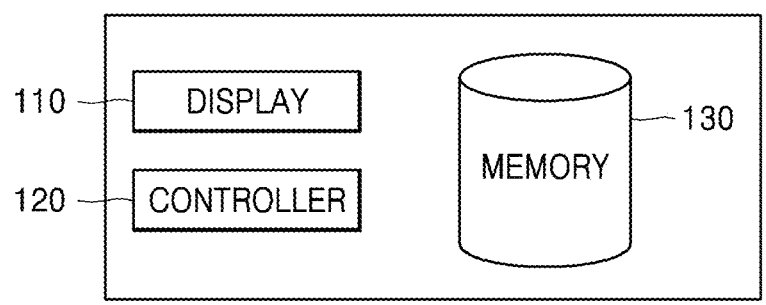

FIGS. 1 and 2 are diagrams of a structure of a user terminal 100 performing a message providing method, according to an example embodiment.

The user terminal 100 may be a personal computer (PC) or a portable terminal. In FIG. 1, the user terminal 100 is a portable terminal (e.g., a smart phone) including a display 110, but is not limited thereto.

Referring to FIG. 2, the user terminal 100 according to an example embodiment may include the display 110, a controller 120, and a memory 130.

The display 110 according to an example embodiment may be a display device displaying a figure, a character, or a combination thereof according to an electric signal generated by the controller 120. For example, the display 110 may be any one of a cathode ray tube (CRT), a liquid crystal display (LCD), a plasma display panel (PDP), and an organic light-emitting diode (OLED), but is not limited thereto.

The display 110 may further include an input unit for obtaining a user input. For example, the display 110 may further include a digitizer configured to read touch coordinates of a user and convert the touch coordinates into an electric signal so as to obtain a user input from a screen displayed on the display device. Accordingly, the display device 110 may be a touch screen including a touch panel. Here, the touch panel may read not only touch coordinates of the user, but also a touch pressure, and convert the touch coordinates and the touch pressure into an electric signal.

In some example embodiments, the input unit may be provided separately from the display 110. For example, the input unit may be any one of a keyboard, a mouse, a track ball, a microphone, and a button, which is provided separately from the display 110.

Hereinafter, one or more example embodiments are described based on the assumption that the display 110 is a touch screen including an input unit capable of determining a touch and a touch pressure of the user, but example embodiments are not limited thereto.

The controller 120 according to an example embodiment may include any type of device capable of processing data, such as a processor. The 'processor' may be a data processing apparatus embodied in hardware and having a physically structured circuit to execute a code included in a program or a function expressed in a command. Examples of such a data processing apparatus include a microprocessor, a CPU, a processor core, a multiprocessor, an application-specific integrated circuit (ASIC), and a FPGA, but is not limited thereto.

The memory 130 according to an example embodiment performs a function of temporarily or permanently storing data, instructions, programs, program codes, or combinations thereof, which are processed by the user terminal 100. Also, the memory 130 may temporarily and/or permanently store message data received from a server. The memory 130 may include a magnetic storage medium or a flash storage medium, but is not limited thereto.

Although not illustrated in FIGS. 1 and 2, the user terminal 100 according to an example embodiment may include a communication unit (or alternatively, communication circuitry). The communication unit may be a device including hardware and software and configured to exchange a signal (e.g., a control signal and/or a data signal) with another network device through a wired/wireless connection, but is not limited thereto.

The controller 120 according to an example embodiment may receive, from a server (not shown), message data including a message and/or metadata (e.g., at least a part of at least one piece of message data including at least one type of keyword).

The server according to an example embodiment may be a device including hardware and software capable of exchanging data with the user terminal 100. The server may operate as a relay transmitting a message received from a first user terminal to a second user terminal. Here, the server may transmit and receive the message and metadata relating to the message to and from the first and second user terminals.

Herein, a message according to an example embodiment may be content to be transmitted from a user to another user. For example, when a user 'Martin' transmits a message "What do you want for lunch?" to a user 'Cornel', the message may be a character string of "What do you want for lunch?"

Meanwhile, metadata according to an example embodiment may be an attribute value of a message. For example, the metadata may include sender information of the message, a transmitted time of the message, and/or chat room information including the message. For example, as described above, when the user 'Martin' transmits the message "What do you want for lunch?" to the user 'Cornel', metadata may include '201604291130' as a transmitted time and 'Chat_Room_ID_1231' as chat room information.

Further, message data according to an example embodiment may be a data structure including the message and the metadata. Accordingly, the message data may include not only content of the message, but also an attribute value of the message.

However, classification of the message, the metadata, and the message data described above is only for convenience of description, and any classification may be used so long as content of a message and an attribute value of the message are represented.

The controller 120 according to an example embodiment may determine whether the message included in the received message data includes at least one desired (or alternatively, pre-set) keyword.

A keyword according to an example embodiment is set by the user, and may be set such that when a message including the keyword is received, the message may be displayed or notified in a manner different from when other messages (e.g., messages not including the keyword) are received.

For example, when the user sets 'lunch' as a keyword and receives a message "What do you want for lunch?", the user terminal 100 may display the received message or notify about reception of the received message in a manner different from other messages not including the keyword. Details about displaying and notifying of a message will be described later below.

Meanwhile, any one of various methods may be used by the controller 120 to determine whether the message includes the at least one desired or pre-set keyword.

For example, the controller 120 may determine inclusion of a keyword via comparison of character strings. As described above, when a keyword is 'lunch' and a message "what do you want for lunch?" is received, the controller 120 may determine that the keyword is included in the message because the message includes the keyword 'lunch'.

In some example embodiments, the controller 120 may determine inclusion of a keyword by determining whether a synonym of the keyword is included in a message. For example, the controller 120 may determine inclusion of a synonym of the keyword or a foreign language word having the same meaning as the keyword by referring to, for example, a dictionary database.

For example, when a message "How about luncheon special?" is received, the controller 120 may determine that the keyword is not included in the message when a method of determining inclusion of the keyword through character string comparison is used. When a synonym-based comparison method as described above is used, however, the controller 120 may determine that the keyword is included in the message by determining that 'lunch' and 'luncheon' are synonyms. As such, a determination range of the controller 120 determining inclusion of a keyword may be expanded.

Meanwhile, a 'reception message' herein may refer to a message that is received by the user terminal 100 and is yet to be checked by the user. Accordingly, the 'reception message' may be a message that has not been checked by the user after entering a chat room including the message, and the message remains unchecked until the user checks the message according to a second input to be described later.

The controller 120 according to an example embodiment may update chat room data of the reception chat room including the message by referring to a result of determining whether the keyword is included in the message and the metadata that are included in the message data.

According to an example embodiment, 'a B chat room including an A message" may refer to a chat room to which the A message belongs is B. In other words, identification (ID) information of the B chat room is included, as chat room information, in message data of the A message.

Meanwhile, according to an example embodiment, 'chat room data' is data including, for example, ID information of a chat room, an interlocutor included in the chat room, a message last received in the chat room, the number of unread messages, and/or information about whether a keyword is included, and may be stored in the memory 130 in the form of a database.

In general, 'chat room data' does not include information about inclusion of a keyword set by a user. Thus, it is difficult for the user to determine whether a conversation is about a subject of interest to the user unless the user pays attention to a chat room. For example, when the chat room includes a plurality of people, the user tends to turn off a message arrival notification of the chat room and thus often misses a message the user should see or a message about a subject of interest to the user.

The controller 120 according to an example embodiment enables the user to easily grasp conversation content by displaying or notifying reception of the message including the keyword by determining whether the message includes the keyword set by the user.

The keyword may be set per chat room. For example, when there are a 'company chat room' and a 'department chat room' of a certain company, a 'temporary holiday' may be set as a keyword in the 'company chat room' and a 'get-together' may be set as a keyword in the 'department chat room'.

In some example embodiments, a plurality of keywords may be set in one chat room. In this case, the controller 120 may display or notify reception of a message including a keyword by using displays and/or notifications distinguished according to the plurality of keywords. Details thereof will be described later below.

The controller 120 may update the chat room data of the reception chat room including the message, when the message including the keyword is received. For example, the controller 120 may update the chat room data of the reception chat room to include reception information of the message including the keyword. Here, the 'reception chat room' may refer to a chat room including the message.

For example, when the chat room data includes 'kwd_1' (default value 0) that is a flag of a keyword 1, the controller 120 may update a value of 'kwd_1' to 1 only when the keyword 1 is found in a message. Here, a value of a flag may simply be 0 or 1 to indicate inclusion of a keyword, or may be 00 or 1F to indicate the number of messages including a keyword. However, the updating of the chat room data is not limited thereto.

The controller 120 according to an example embodiment may display a chat room list including inclusion information of a keyword in each chat room by referring to the updated chat room data.

According to an example embodiment, a chat room list may refer to a list displaying abstract information of one or more chat rooms. Here, the chat room list may include one or more regions displaying the abstract information per chat room.

For example, 'abstract information' of a chat room may include the number of people participating in the chat room, a name of the chat room, a message last received in the chat room, a received time of the last received message, the number of unread messages, and information indicating inclusion of a keyword in the message (hereinafter, referred to as inclusion information of a keyword).

According to an example embodiment, when the controller 120 'displays' an object (e.g., when 'the controller 120 displays a chat room list'), the controller 120 may generate an electric signal corresponding to the object such that the display 110 displays the object. Accordingly, the controller 120 may generate display data corresponding to the chat room list, and the display 110 may display, for example, a figure, a character, or a combination thereof according to the generated display data.

When it is determined that the chat room data of the chat room includes reception information of the message including the keyword by referring to the chat room data, the controller 120 may display at least a part of the keyword in a region of the chat room list where information of the chat room is displayed.

For example, as described above, when 'kwd_1' that is the flag of the keyword 1 is included in the chat room data, and the value of 'kwd_1' is 1 (which indicates that the message including the keyword 1 is received), the controller 120 may display at least a part of the keyword 1 as abstract information of the chat room. For example, when the keyword 1 is "lunch", the controller 120 may display, for example, "chat room 1" (a name of the chat room), "5" as the number of people participating in the chat room, and "24" as the number of unread messages, together with "lunch" (the keyword 1) in the region where the information of the chat room is displayed. Accordingly, the user may easily determine a keyword included in a message without having to enter the chat room. Also, a conversation subject of the chat room may be quickly grasped based on the keyword displayed as a part of the abstract information.

In some example embodiments, when a plurality of keywords are set in one chat room and a plurality of messages including the plurality of keywords are received, the controller 120 may display only a part of the keyword in the region of the chat room list where information of the chat room is displayed. For example, when the keyword is "lunch" as described above, the controller 120 may display only "lun" (e.g., the first syllable of the keyword). In addition, the controller 120 may further display the number of messages including each of the plurality of keywords, together with the keywords. For example, the controller 120 may display "lunch[3]" to show "3" (e.g., the number of messages including the keyword "lunch") together with the keyword.

While displaying the chat room list, the controller 120 may display the reception chat room at the top of the chat room list. Here, the 'reception chat room' may refer to a chat room in which a message is posted. Accordingly, when there are a plurality of chat rooms in which chat room data includes reception information indicating that a message includes or does not include a keyword, the controller 120 may use, as a criteria for arranging the plurality of chat rooms, reception of the message including the keyword or the number of reception messages including the keyword.

For example, when a first chat room is a reception chat room in which chat room data includes reception information of a message including a keyword, and second through fourth chat rooms are not reception chat rooms, the controller 120 may display the first chat room at the top of the chat room list.

As another example, when the first through fourth chat rooms are all reception chat rooms, the controller 120 may display a reception chat room that received the most messages including the keyword at the top of the chat room list or display a reception chat room that most recently received the message including the keyword at the top of the chat room list. However, such arrangement of the plurality of reception chat rooms is only an example, and example embodiments are not limited thereto.

In some example embodiments, while displaying the chat room list, the controller 120 may display a region where the information of the reception chat room is displayed in a display format different from a region where information of another chat room is displayed.

For example, the controller 120 may display a background of the region where the information of the reception chat room is displayed in a first color and display a background of the region where the information of the other chat room is displayed in a second color distinguished from the first color, in the chat room list. In this case, the user may determine reception of a message including a keyword intuitively through a background of a region where information of a chat room is displayed.

Moreover, the controller 120 may differently display the background of the region where the information of the reception chat room is displayed, according to keywords. For example, when a message including a first keyword is received, the background may be displayed in a first color, and when a message including a second keyword is received, the background may be displayed in a second color.

Further, the controller 120 may display the background of the region where the information of the reception chat room is displayed in a degree of darkness proportional to the number of keywords included in one or more messages.

The controller 120 according to an example embodiment may obtain a first input of the user with respect to the region where the information of the reception chat room is displayed. Here, as described above, the 'reception chat room' may refer to a chat room in which chat room data of the chat room includes reception information of a message including a keyword.

That 'a D input with respect to a C region' may refer to that the D input of the user with respect to a portion where the C region is displayed on the display 110. As described above, the display 110 may be a touch screen, and thus the first input and a second input described later may be user inputs performed on the touch screen. For example, the first and second inputs may each be any one of a simple touch input, an input having different touch pressures, an input moving in one direction at a desired (or alternatively, pre-set) speed or higher, an input including a plurality of inputs repeated within a desired (or alternatively, pre-set) period of time, and an input continued for a desired (or alternatively, pre-set) period of time.

According to an example embodiment, the first input may be an input for previewing only the message including the keyword from among reception messages included in the chat room, without having to enter the chat room. For example, the first input may be an input having different touch pressures or an input including a plurality of inputs repeated within a desired (or alternatively, pre-set) period of time.

The second input may be an input for entering the chat room to check all of the messages included in the chat room. For example, the second input may be a single touch. However, the first and second inputs described above are only examples, and example embodiments are not limited thereto.

The controller 120 according to an example embodiment may display a preview window including one or more messages including the keyword, from among one or more reception messages included in the chat room, according to the first input of the user.

The preview window according to an example embodiment may be a window gathering and displaying only the messages including the keyword, which are included in the reception chat room and not yet read by the user. The controller 120 may display only the messages including the keyword through the preview window such that the user quickly grasps interested content of messages without having to check the messages by entering the chat room.

For example, let's assume that a chat room 1 includes messages "What do you want for lunch?" sent by a user 'Martin', "How about Chinese food?" sent by a user 'Cornel', "pizza?" sent by a user 'Carlos', and "I want a hamburger" sent by a user 'Edward', the user has not yet read these 4 messages, and "lunch", "pizza", "steak", and "curry" are set as keywords of the chat room 1.

In this case, the controller 120 may display a preview window including the message "What do you want for lunch?" from the user 'Martin', which includes the keyword "lunch", and the message "pizza?" from the user 'Carlos', which includes the keyword "pizza". Here, as described above, the controller 120 may display the keywords "lunch" and "pizza" in the region of the chat room list where the information of the chat room 1 is displayed. Further, the controller 120 may update the chat room data such that the chat room data of the chat room 1 includes information that the messages including the keywords "lunch" and "pizza" are received.

In some example embodiments, the controller 120 according to an example embodiment may display the chat room list in a first display region and the preview window in a second display region.

The first and second display regions according to an example embodiment may refer to separate regions displaying content on one display 110, or may refer to a display region of one display 110.

For example, when the user terminal 100 according to an example embodiment includes a plurality of the display 110, the controller 120 may display the chat room list in the first display region (e.g., a display region of a first display (not shown)), and the preview window in the second display region(e.g., a display region of a second display (not shown)).

When the user terminal 100 according to an example embodiment includes one display 110, the controller 120 may display the chat room list in the first display region of the display 110, and the preview window in the second display region of the display 110. For example, the controller 120 may display content of the second display region to overlap content of the first display region. Here, overlapping may mean that the content of the second display region is displayed on the display 110 within a range where the first and second display regions overlap each other. In some example embodiments, the controller 120 may display a first layer where the first display region is displayed to overlap a second layer where the second display region is displayed. At this time, the controller 120 may assume that the second layer is above the first layer (meaning that the controller 120 may prioritize the second layer such that the content of the second display region is displayed on the display 110 within the range where the first and second display regions overlap each other.

For example, when the controller 120 receive a first input with respect to one chat room from a chat room list displayed in the a first display region, the controller 120 may display a preview window in a second display region overlapping the first display region. For example, the controller 120 may prioritize displaying of the preview window before displaying of the chat room list displayed in the first display region, within a range where the second display region is displayed.

Hereinafter, for convenience of description, it is described that the second display region is displayed in the display 110 while overlapping the first display region, the second display region is smaller than the first display region, and the first display region is an entire display region of the display 110, but example embodiment are not limited thereto.

The controller 120 according to an example embodiment may receive a second input of the user with respect to a region of the chat room list where information of the reception chat room is displayed. At this time, the controller 120 may display one or more chat messages included in the reception chat room according to the second input. As described above, the second input may be a certain input for the user to enter the reception chat room to check all messages in the reception chat room, and thus the controller 120 may display the one or more chat messages included in the reception chat room, according to the second input. Meanwhile, the 'chat messages' may refer to a series of messages exchanged between people in the reception chat room.

For example, when a keyword is included in a chat message, the controller 120 may display the keyword in a first display format, and when the keyword is not included in the chat message, the controller 120 may display the chat message in a second display format different from the first display format.

For example, the first display format may be any visual process emphasizing the keyword, such as an underlining process, a highlighting process, a shadowing process, or a background coloring process.

As such, the controller 120 may emphasize the message including the keyword by displaying the keyword in the first display format and displaying other messages that do not include the keyword in the second display format. Accordingly, the user may easily check important messages including the keyword.

In some example embodiments, the controller 120 may display the entire message including the keyword in the first display format and the other messages in the second display format to perform a visual emphasizing process in units of whole messages.

In some example embodiments, the controller 120 may initialize the reception information of the keyword, which is included in the chat room data, when the user entered the reception chat room and checked unread messages.

For example, the controller 120 may initialize a flag of the keyword included in the chat room data of the reception chat room. As described above, when the chat room data includes a value "1" of the flag of the keyword 1 (e.g., a value of 'kwd_1' is "1"), the controller 120 may initialize the value of 'kwd_1' from 1 to 0 (the default value of 'kwd_1'). Thus, when the user checked the one or more chat messages included in the reception chat room, the controller 120 may initialize the reception information of the keyword, which is included in the chat room data, such that the reception information of the keyword is no longer displayed on the chat room list.

The controller 120 according to an example embodiment may refer to the updated chat room data to generate a message arrival notification.

According to an example embodiment, 'generating of a message arrival notification' may mean displaying that a message is arrived on the display 110. Here, the arrival of the message may be notified by displaying at least a part of content of the message or by displaying a certain phrase, such as "new message received", regardless of the message. In some example embodiments, the 'generating of the message arrival notification' may mean that the user is notified of the arrival of the message by the use of at least one of a sound, vibration, and/or light generating units included in the user terminal 100.

The controller 120 may generate a message arrival notification when a message including a keyword is received, even when the message arrival notification function of a chat room is turned off. Accordingly, even when the message arrival notification function is turned off, the user may be notified of an arrival of an interested message.

In some example embodiments, the controller 120 may generate different notifications according to types of keywords included in messages. For example, the controller 120 may generate a sound of a first note for a first keyword and generate a sound of a second note for a second keyword. Accordingly, the user may intuitively determine which message is received without having to separately manipulate the user terminal 100.

Figure 3:
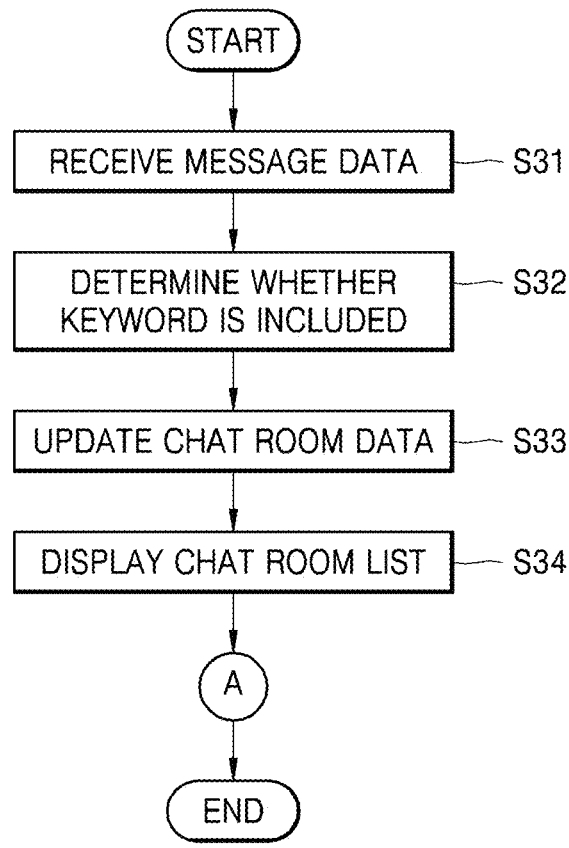
FIG. 3 is a flowchart of a message providing method performed by a user terminal, according to an example embodiment.
Figure 4A:
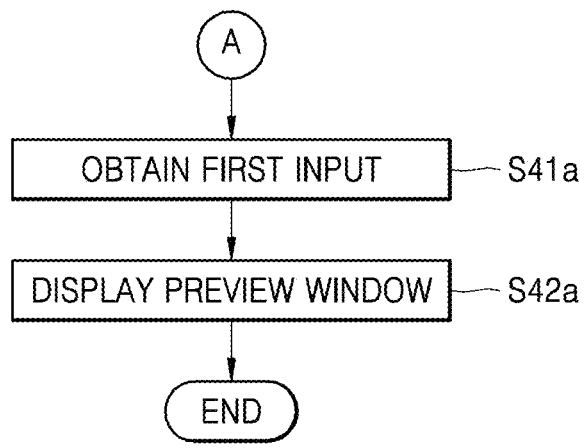
FIGS. 4A and 4B are flowcharts of a method of providing a message according to a user input, according to some example embodiments.
Figure 4B:
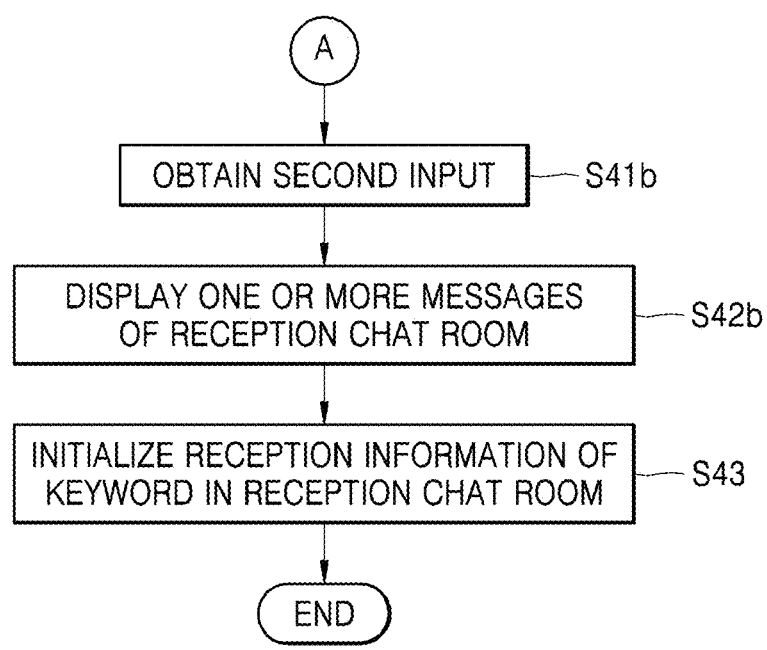

FIGS. 3 through 4B are flowcharts of message providing methods performed by the user terminal 100, according to some example embodiments. Hereinafter, details overlapping those of FIGS. 1 and 2 are not provided again.

First, referring to FIG. 3, the controller 120 according to an example embodiment may receive message data including a message and metadata, from a server, in operation S31. Here, the message data may be a data structure including the message and the metadata, as described above. Accordingly, the message data may include not only content of the message, but also an attribute value of the message.

The controller 120 according to an example embodiment may determine whether at least one desired or pre-set keyword is included in the message included in the message data, in operation S32. Any one of various methods may be used by the controller 120 to determine whether the at least one desired or pre-set keyword is included in the message. For example, the controller 120 may determine inclusion of the keyword via character string comparison. In some example embodiments, the controller 120 may determine the inclusion of the keyword by determining whether a synonym of the keyword is included in the message.

The controller 120 according to an example embodiment may update chat room data of a reception chat room including the message in operation S33, by referring to the metadata included in the message data and a result of determining whether the keyword is included in the message. Accordingly, the controller 120 may update the chat room data of the reception chat room such that the chat room data includes reception information of the message including the keyword. Here, the 'reception chat room' may refer to a chat room including the message.

The controller 120 according to an example embodiment may display a chat room list including inclusion information of the keyword of each chat room, by referring to the updated chat room data, in operation S34. The chat room list may be a list of abstract information of one or more chat rooms. Further, the chat room list may include at least one region displaying abstract information per chat room. Accordingly, the controller 120 may display at least a part of the keyword in a region of the chat room list where information of the chat room is displayed when the chat room data of the chat room includes the reception information of the message including the keyword, by referring to the chat room data.

FIGS. 4A and 4B are flowcharts of a method of providing a message according to a user input, according to some example embodiments. FIG. 4A is a flowchart of a method of displaying a preview window according to a first input, and FIG. 4B is a flowchart of a method of displaying an entire message according to a second input.

First, referring to FIG. 4A, the controller 120 according to an example embodiment may obtain a first input of a user with respect to a region where information of a reception chat room is displayed, in operation S41a. Here, the 'reception chat room' may be a chat room in which chat room data of the chat room includes reception information of a message including a keyword. Further, the first input may be an input for previewing only the message including the keyword from among reception messages included in the chat room, without having to enter the chat room.

The controller 120 according to an example embodiment may display a preview window including the message including the keyword from among the reception messages included in the chat room, according to the first input, in operation S42a. The preview window may be a window gathering and displaying only reception messages including the keyword, which have not been checked by the user. According to an example embodiment, the controller 120 may display the chat room list in a first display region and the preview window in the second display region. In addition, the controller 120 may configure the display 110 to display the second display region on the first display region in an overlapping manner.

Referring to FIG. 4B, the controller 120 according to an example embodiment may obtain a second input of the user with respect to the region of the chat room list where the information of the reception chat room is displayed, in operation S41b. The second input may be an input for the user to enter the chat room to check all messages included in the chat room, and the controller 120 may display one or more messages included in the reception chat room according to the second input, in operation S42b. According to an example embodiment, when the keyword is included in a chat message, the controller 120 may display the chat message in a first display format, and when the keyword is not included in the chat message, the controller 120 may display the chat message in a second display format different from the first display format. For example, the first display format may be any visual processes for emphasizing the chat message (e.g., an underlining process, a highlighting process, a shadowing process, and/or a background coloring process).

When the user entered the reception chat room and checked an unread message, the controller 120 according to an example embodiment may initialize reception information of the keyword included in the chat room data, in operation S43. In some example embodiments, when the user checked one or more chat messages (but not an entirety of the chat messages) in the reception chat room, the controller 120 may initialize the reception information of the keyword included in the chat room data such that the reception information is no longer displayed on the chat room list.

FIGS. 5 through 8C illustrate screens displayed on the user terminal 100, according to some example embodiments.

Figure 5:
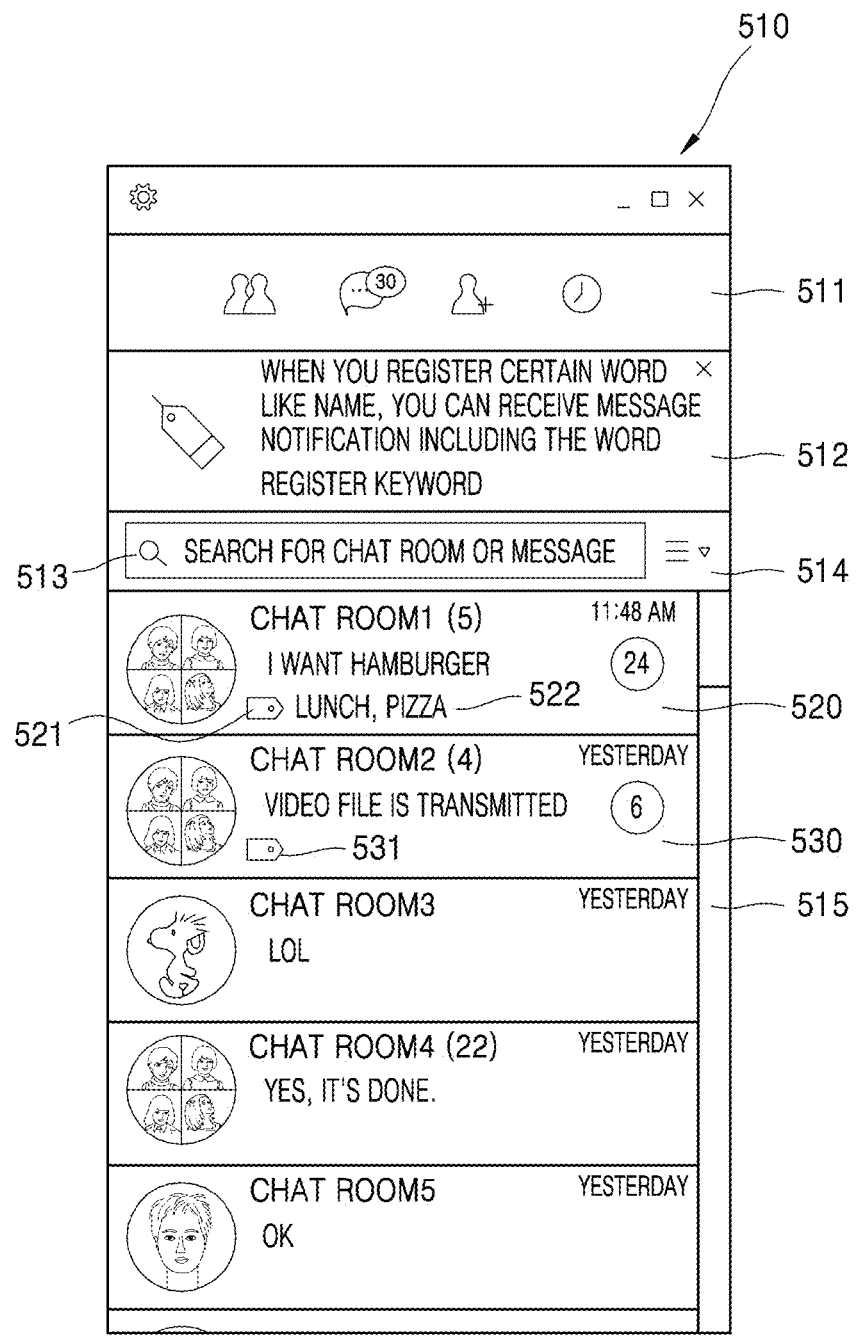
FIG. 5 illustrates an example of a chat room list displayed on a display of a user terminal, according to an example embodiment.

FIG. 5 illustrates an example of a chat room list 515 displayed on the display 110 of the user terminal 100, according to an example embodiment.

Referring to FIG. 5, a screen 510 may include a tab menu 511 for switching a display screen to an interlocutor list, a chat room list, and a setup menu, a notice window 512 displaying a guide relating to a keyword registration and notification function, a search window 513 for searching for a chat room or a message, a dropdown menu button 514 for selecting priority criteria for displaying chat rooms in the chat room list 515, the chat room list 515 displaying abstract information of one or more chat rooms, and regions 520 and 530 where abstract information of each chat room are displayed.

The region 520 where abstract information of a chat room 1 is displayed may display "chat room 1" as a name of a chat room, "5" as the number of people in the chat room, "24" as the number of unread messages, "11:48 am" as an arrival time of the last message, and "I want hamburger" as content of the last message, and may further display an indication 521 that a keyword filter function is set and an indication 522 of keywords (e.g., "lunch" and "pizza") included in unread messages.

Meanwhile, the region 530 where abstract information of a chat room 2 is displayed only displays indication 531 that the keyword filter function is set, which may mean that there is no message including a keyword from among 6 unread messages.

Figure 6:
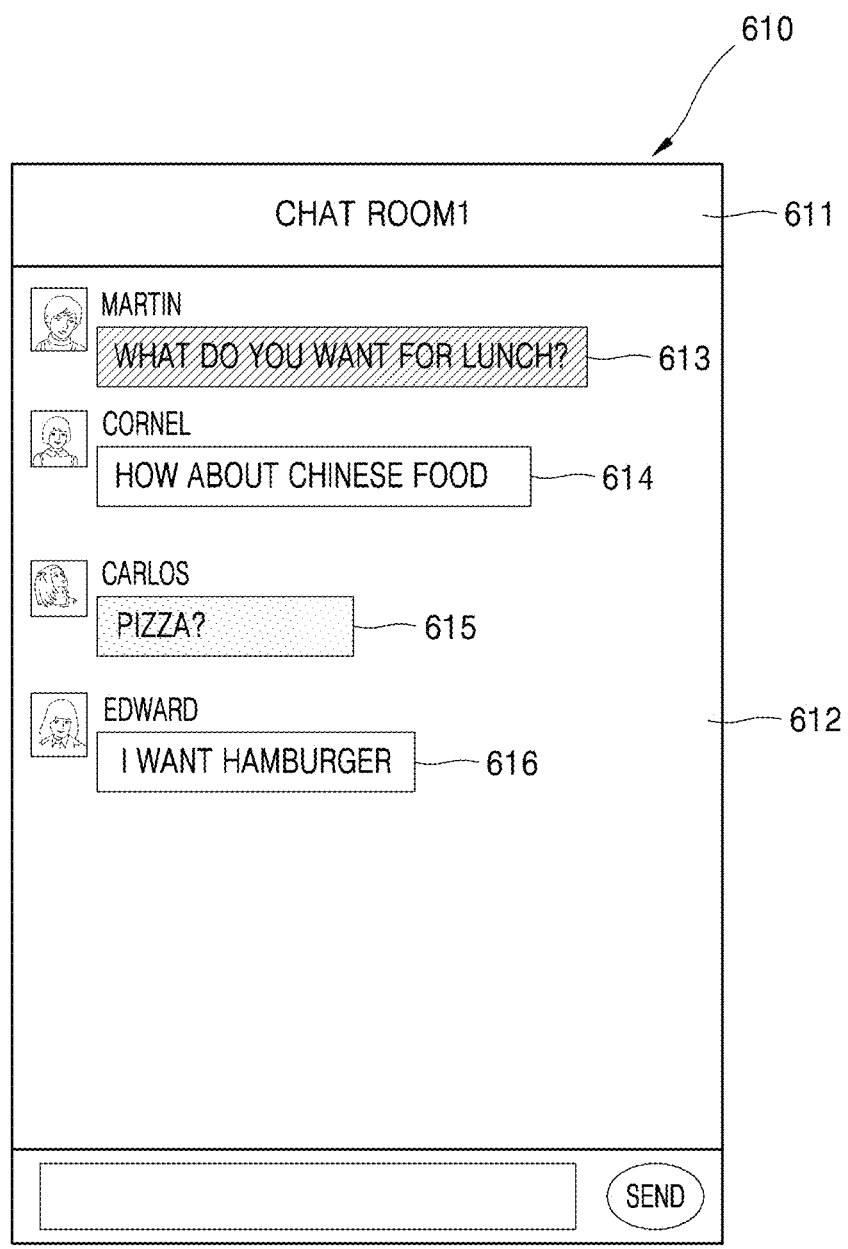
FIG. 6 illustrates a screen displaying a chat room of FIG. 5.

FIG. 6 illustrates a screen 610 displaying the chat room 1 of FIG. 5.

The controller 120 may receive an input (the second input described above) of the user with respect to the region of the chat room list where information of the reception chat room is displayed, and display one or more chat messages included in the reception chat room. In other words, the user may provide an input (e.g., the second input) on the region 520 of FIG. 5 where the information of the chat room 1 is displayed to display the screen 610 of FIG. 6 displaying one or more chat messages.

Referring to FIG. 6, the screen 610 may include a region 611 where a title of a chat room is displayed and a region 612 where a chat message is displayed. Here, the region 612 may include chat messages 613 through 616.

When "lunch" and "pizza" are set as keywords in the chat room 1 of FIG. 6, the controller 120 may display the messages 613 and 615 including the keywords in display formats distinguished from the messages 614 and 616. Further, the controller 120 may display the messages 613 and 615 including different keywords in different display formats.

Figure 7:
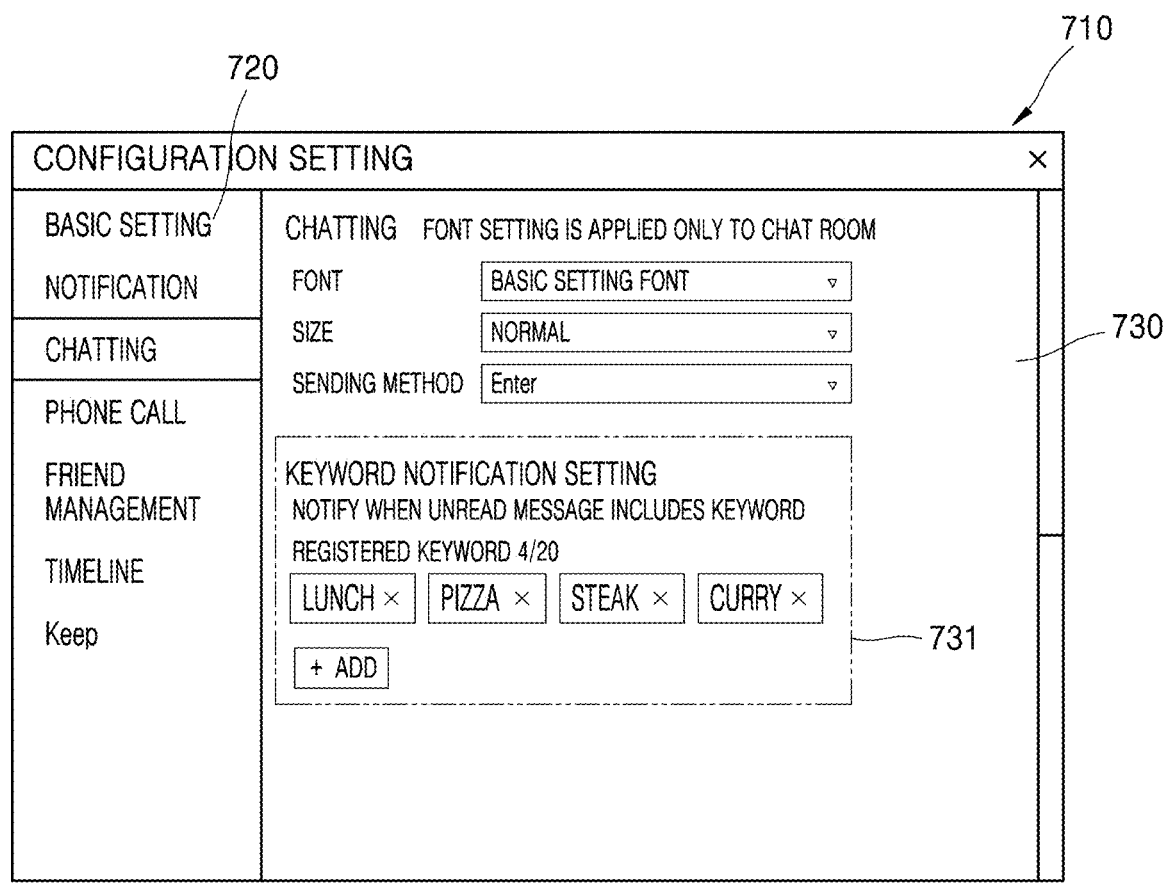
FIG. 7 illustrates a setup screen of the chat room of FIG. 6.

FIG. 7 illustrates a setup screen 710 of the chat room 1 of FIG. 6.

Referring to FIG. 7, the setup screen 710 may include a region 720 where major classification items of settings are displayed, and a region 730 where sub items of each major classification item are displayed.

The setup screen 710 according to an example embodiment may further include items 731 relating to keyword notification settings, in addition to general classification items. For example, a user may register a keyword in a keyword notification setting item, and thus the indication 522 of FIG. 5 indicating that the keyword is included in the unread message may be displayed on the chat room list 510 of FIG. 5.

In FIG. 7, "lunch", "pizza", "steak", and "curry" are registered as keywords of the chat room 1 (chat room 1 of FIG. 5). Accordingly, when there is an unread message including any one of the four keywords (refer to FIG. 6), the indication 522 may be displayed in the region 520 of FIG. 5.

Figure 8A:
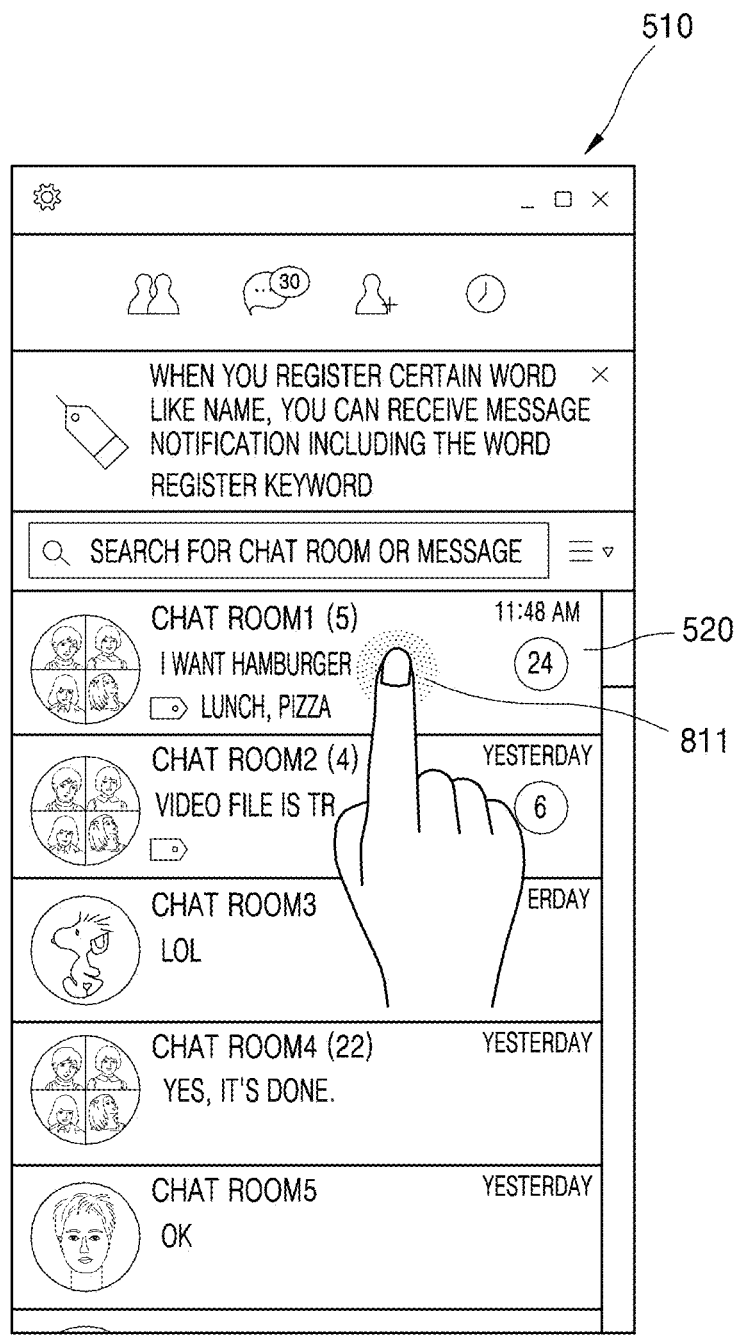
FIGS. 8A and 8B are diagrams for describing a process of performing, by a user, a first input with respect to a region where information of the chat room is displayed, according to an example embodiment.
Figure 8B:
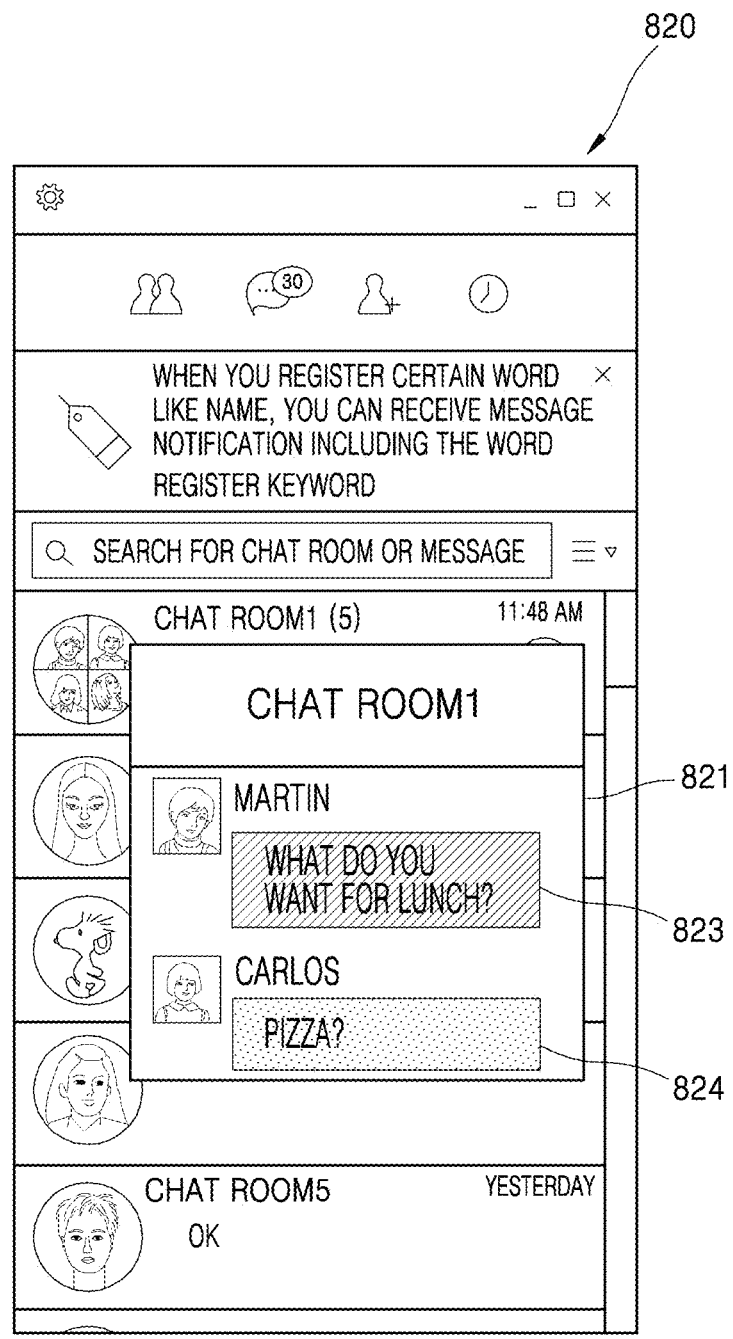

FIGS. 8A and 8B are diagrams for describing a process of performing, by a user, a first input 811 with respect to the region 520 where information of the chat room 1 is displayed, according to an example embodiment. For example, the first input 811 may be an input having a plurality of different touch pressures. In some example embodiments, the user may perform the input having the plurality of different touch pressures on the region 520 such that a preview window is displayed. In some other example embodiments, the first input 811 may be an input continued for a desired or pre-set period of time. In this case, the user may perform the input continued for the desired or pre-set period of time on the region 520 such that the preview window is displayed. Details about the preview window will be described with reference to FIG. 8B.

FIG. 8B illustrates a screen 820 displaying a preview window 821 according to the first input 811 of a user.

Referring to FIG. 8B, the preview window 821 may display only messages 823 and 824 including keywords. For example, when a chat room 1 includes four messages 613 through 616 of FIG. 6, and keywords are set in the chat room 1 as in FIG. 7, the controller 120 may display, in the preview window 821, the message "what do you want for lunch?" from the user 'Martin' including the keyword "lunch" and the message "pizza?" from the user 'Carlos' including the keyword "pizza".

For example, the preview window 821 may overlap a chat room list displayed in the screen 820, as shown in FIG. 8B.

One or more example embodiments may include methods and/or computer programs whereby when a keyword set by a user is determined to be included in a received message, the reception of the message is displayed or notified to a user to enable the user to easily determine whether the message interests the user and to quickly grasp conversation content.

Also, one or more example embodiments may include methods and/or computer programs whereby a keyword included in a received message is displayed on a chat room list to enable a user to quickly grasp conversation content without having to enter a chat room.

Further, one or more example embodiments may include methods and/or computer programs whereby only messages including a keyword are gathered and a preview of the messages are displayed according to a user input with respect to a region where information of a chat room is displayed to enable a user to conveniently grasp the messages.

The foregoing description has been provided for purposes of illustration and description. It is not intended to be exhaustive or to limit the disclosure. Individual elements or features of the particular example embodiments do not limit example embodiment, and where applicable, may be appropriately interchanged or modified, although not specifically shown or described. The example embodiments may also be modified in various ways. Such modifications are not to be regarded as a departure from the disclosure, and all such modifications are intended to be included within the scope of the disclosure.

What is claimed is:

1. A non-transitory computer-readable recording medium having recorded thereon a computer program, which when executed by a computer, configures the computer to perform:
   receiving message data including a message and metadata from a server;
   determining whether at least one keyword is included in the message;
   updating chat room data of a reception chat room to include the message with reference to a result of the determining and the metadata, the resulting of the determining indicating that the at least one keyword is included in the message;
   displaying a chat room list including the reception chat room;
   receiving a second input of a user with respect to a region of the chat room list in which information of the reception chat room is displayed; and
   displaying at least one chat message included in the reception chat room in response to the second input, the at least one chat message including the message,
   wherein a display format of at least one of the message and the at least one keyword in the message is different from formats of other messages in the at least one chat message.

2. The non-transitory computer-readable recording medium of claim 1, wherein the displaying of the at least one chat message comprises:
   displaying only the at least one keyword in the chat message according to a first display format and other portions of the chat message except the at least one keyword according to a second display format in response to the chat message including the at least one keyword, the second display format being different from the first display format, and
   entirely displaying the chat message according to the second display format in response to the chat message not including the at least one keyword.

3. The non-transitory computer-readable recording medium of claim 1, wherein the displaying of the at least one chat message comprises:
   entirely displaying the chat message according to a first display format in response to the chat message including the at least one keyword; and
   entirely displaying the chat message according to a second display format distinguished from the first display format, in response to the chat message not including the at least one keyword.

4. The non-transitory computer-readable recording medium of claim 1, wherein the determining comprises:
   determining whether the message includes a synonym or a foreign word having a same meaning with respect to each of the at least one keyword.

5. The non-transitory computer-readable recording medium of claim 1, wherein the determining comprises:
   determining whether the message includes the at least one keyword considering the at least one keyword that is set to be different for each chat room.

6. The non-transitory computer-readable recording medium of claim 1, further comprising, after the displaying of the at least one chat message:
   initializing reception information of the at least one keyword included in the chat room data of the reception chat room.

7. The non-transitory computer-readable recording medium of claim 1, further comprising, after the updating of the chat room data:
- generating a message arrival notification with reference to the updated chat room data.

8. The non-transitory computer-readable recording medium of claim 7, wherein the generating of the message arrival notification comprises:
- generating the message arrival notification in response to the message including the at least one keyword being received, regardless of setting of the message arrival notification to the reception chat room.

9. The non-transitory computer-readable recording medium of claim 7, wherein the generating the message arrival notification comprises:
- generating a first arrival notification in response to a first keyword; and
- generating a second arrival notification in response to a second keyword.

* * * * *

UNITED STATES PATENT AND TRADEMARK OFFICE
CERTIFICATE OF CORRECTION

| | | |
|---|---|---|
| PATENT NO. | : 11,575,635 B2 | Page 1 of 1 |
| APPLICATION NO. | : 17/574877 | |
| DATED | : February 7, 2023 | |
| INVENTOR(S) | : Eun Hyuk Kim et al. | |

It is certified that error appears in the above-identified patent and that said Letters Patent is hereby corrected as shown below:

On the Title Page (72), Line 6, the 6th inventor's name reads as Chui Soon CHOI, but should read Chul Soon CHOI.

Signed and Sealed this
Fourth Day of July, 2023

Katherine Kelly Vidal
*Director of the United States Patent and Trademark Office*